US011317372B2

(12) United States Patent
Liu (10) Patent No.: US 11,317,372 B2
(45) Date of Patent: Apr. 26, 2022

(54) INFORMATION TRANSMISSION METHOD AND APPARATUS, AND COMPUTER-READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 132 days.

(21) Appl. No.: 16/636,471

(22) PCT Filed: Aug. 7, 2017

(86) PCT No.: PCT/CN2017/096265
§ 371 (c)(1),
(2) Date: Feb. 4, 2020

(87) PCT Pub. No.: WO2019/028605
PCT Pub. Date: Feb. 14, 2019

(65) Prior Publication Data
US 2020/0245288 A1 Jul. 30, 2020

(51) Int. Cl.
*H04W 68/00* (2009.01)
*H04W 72/04* (2009.01)
(Continued)

(52) U.S. Cl.
CPC ....... *H04W 68/005* (2013.01); *H04W 72/042* (2013.01); *H04W 72/0453* (2013.01)

(58) Field of Classification Search
None
See application file for complete search history.

(56) References Cited

U.S. PATENT DOCUMENTS

2018/0192383 A1* 7/2018 Nam ............... H04W 48/12
2018/0199309 A1* 7/2018 Islam ............. H04W 72/046
(Continued)

FOREIGN PATENT DOCUMENTS

CN 106465375 A 2/2017
CN 106686729 A 5/2017
(Continued)

OTHER PUBLICATIONS

Islam, U.S. Appl. No. 62/476,678, filed Mar. 24, 2017 (Year: 2017).*
(Continued)

*Primary Examiner* — Jay L Vogel
(74) *Attorney, Agent, or Firm* — Finnegan, Henderson, Farabow, Garrett & Dunner, L.L.P.

(57) ABSTRACT

The present disclosure provides an information transmission method and apparatus, and a computer-readable storage medium, and belongs to the field of communication. The method includes: sending a synchronization signal block (SSB) and paging indication information through a first beam, wherein the puling indication information is configured to identify user equipment (UE) paged by a base station in a cell served by the base station; and sending a first control resource set (CORSET) through a second beam, wherein the first CORSET includes a plurality of physical downlink control channels (PDCCHs), and the plurality of PDCCHs comprised in the first CORSET carry first downlink control information (DCI) configured to instruct the UE paged by the base station to acquire a paging message according to the first DCI. A technical solution of the present disclosure can reduce monitoring duration of the first UE, thereby reducing power consumption of the first UE.

19 Claims, 6 Drawing Sheets

(51) Int. Cl.
*H04W 16/28* (2009.01)
*H04W 48/12* (2009.01)
*H04W 68/02* (2009.01)

(56) References Cited

U.S. PATENT DOCUMENTS

| | | | | |
|---|---|---|---|---|
| 2018/0376454 | A1* | 12/2018 | Strom | H04L 27/2602 |
| 2019/0021119 | A1* | 1/2019 | Ng | H04W 48/10 |
| 2019/0327709 | A1* | 10/2019 | Li | H04W 76/11 |
| 2019/0387504 | A1* | 12/2019 | Jung | G06F 17/142 |
| 2020/0059891 | A1* | 2/2020 | Huang | H04W 72/1278 |
| 2020/0404617 | A1* | 12/2020 | Murray | H04W 52/0229 |

FOREIGN PATENT DOCUMENTS

| | | | |
|---|---|---|---|
| CN | 106792792 A | 5/2017 | |
| CN | 107018497 A | 8/2017 | |
| WO | WO 2008083580 A1 | 7/2008 | |

OTHER PUBLICATIONS

Astrom, U.S. Appl. No. 62/523,471, filed Jun. 22, 2017 (Year: 2017).*
Extended European Search Report of counterpart EP Application No. 17920717.0 dated Feb. 17, 2021.
Huawei et al., Multi-beam Paging for NR; 3GPP TSG RAN WG1 NR Ad-Hoc#2; R1-1709916, Jun. 27-30, 2017, Qingdao, China, 3 pages.
Ericsson, On NR paging design; 3GPP TSG-RAN WG1 Meeting #88-bis; R1-176013, Apr. 3-7, 2017, Spokane, US, 4 pages.
MediaTek Inc., Paging in NR with Beam Sweeping; 3GPP TSG-RAN WG2 Meeting #97; R2-170xxxx, Feb. 13-17, 2017, Athens, Greece, 4 pages.
Examination Report of counterpart Indian Application No. 202027008143 dated Apr. 29, 2021.
International Search Report and Written Opinion of PCT Application No. PCT/CN2017/096265 dated Apr. 27, 2018.
First Office Action of Chinese Application No. 201780000776.5 dated Jul. 19, 2019.

* cited by examiner

INFORMATION TRANSMISSION METHOD AND APPARATUS, AND COMPUTER-READABLE STORAGE MEDIUM

CROSS REFERENCE TO RELATED APPLICATIONS

This application is a national phase application based on PCT/CN20171096265, filed Aug. 7, 2017, the content of which is incorporated herein by reference.

TECHNICAL FIELD

The present disclosure relates to the field of communication, and in particular, to an information transmission method and apparatus, and a computer-readable storage medium.

BACKGROUND

In order to facilitate data interaction between UE (User Equipment) and a communication network in a communication system, a base station usually is required to send a synchronization signal and system information to UEs in a service range of the base station, so that the UEs can be synchronized with the base station in time and frequency according to the synchronization signal, and can randomly access the base station according to the system information. In addition, the base station is further required to send a paging message to the UEs in the service range of the base station, so as to enable paged UE to respond to the paging according to the paging message sent by the base station.

Currently, a mechanism for transmitting information based on beam sweeping is introduced in a standardization discussion of the 5G (The Fifth Generation Mobile Communication Technology). In this mechanism, it is required to employ the beam sweeping to send the synchronization signal, the system information, and the paging message. Therefore, at present, there is an urgent need for a technical solution for transmitting the synchronization signal, the system information, and the paging message based on the beam sweeping.

SUMMARY

According to a first aspect of the embodiments of the present disclosure, there is provided an information transmission method, comprising:

sending a synchronization signal block (SSB) and paging indication information through a first beam, wherein the paging indication information is configured to identify user equipment (UE) paged by a base station in a cell served by the base station; and sending a first control resource set (CORSET) through a second beam, wherein the first CORSET comprises a plurality of physical downlink control channels (PDCCHs), the plurality of PDCCHs comprised in the first CORSET carry first downlink control information (DCI) which is configured to instruct the UE paged by the base station to acquire a paging message according to the first DCI, and a timing index of the first beam corresponds to a timing index of the second beam.

According to a second aspect of the embodiments of the present disclosure, there is provided an information transmission method, comprising:

receiving an SSB through a first beam;

receiving paging indication information through the first beam, wherein the paging indication information is configured to identify UE paged by a base station in a cell served by the base station;

acquiring first DCI from a first CORSET sent by the base station through a second beam when the paging indication information identifies that first UE is paged by the base station, wherein the first. CORSET comprises a plurality of PDCCHs, and the plurality of PDCCHs comprised in the first CORSET carry the first DCI; and acquiring a paging message sent by the base station to the first UE according to the first DCI, wherein a timing index of the first beam corresponds to a timing index of the second beam.

According to a third aspect of the embodiments of the present disclosure, there is provided a base station, comprising:

a first sending module, configured to send a synchronization signal block (SSB) and paging indication information through a first beam, wherein the paging indication information is configured to identify user equipment (UE) paged by the base station in a cell served by the base station; and a second sending module, configured to send a first control resource set (CORSET) through a second beam, wherein the first CORSET comprises a plurality of physical downlink control channels (PDCCHs), the plurality of PDCCHs comprised in the first CORSET carry first downlink control information (DCI) which is configured to instruct the UE paged by the base station to acquire a paging message according to the first DCI, and a timing index of the first beam corresponds to a timing index of the second beam.

According to a fourth aspect of the embodiments of the present disclosure, there is provided a first UE, the first UE is any one of UEs in a cell served by a base station, and the first UE comprises:

a receiving module, configured to receive an SSB through a first beam, and further receive paging indication information through the first beam, wherein the paging indication information is configured to identify UE paged by the base station in the cell served by the base station;

a first acquiring module, configured to acquire first DCI from a first CORSET sent by the base station through a second beam when the paging indication information identifies that the first UE is paged by the base station, wherein the first. CORSET comprises a plurality of PDCCHs, and the plurality of PDCCHs comprised in the first CORSET carry the first DCI; and a second acquiring module, configured to acquire a paging message sent by the base station to the first UE according to the first DCI, wherein a timing index of the first beam corresponds to a timing index of the second beam.

According to a fifth aspect of the embodiments of the present disclosure, there is provided an information transmission apparatus, comprising:

a processor; and a memory configured to store an instruction executable by the processor, wherein the processor is configured to:

send a synchronization signal block (SSB) and paging indication information through a first beam, wherein the paging indication information is configured to identify user equipment (UE) paged by the base station in a cell served by the base station; and send a first control resource set (CORSET) through a second beam, wherein the first CORSET comprises a plurality of physical downlink control channels (PDCCHs), the plurality of PDCCHs comprised in the first CORSET carry first downlink control information (DCI) which is configured to instruct the UE paged by the base station to acquire a paging message according to the first DCI, wherein a timing index of the first beam corresponds to a timing index of the second beam.

According to a sixth aspect of the embodiments of the present disclosure, there is provided an information transmission apparatus, comprising:

a processor; and a memory configured to store an instruction executable by the processor, wherein the processor is configured to:

receive an SSB through a first beam;

receive paging indication information through the first beam, wherein the paging indication information is configured to identify UE paged by a base station in a cell served by the base station;

acquire first DCI from a first CORSET sent by the base station through a second beam when the paging indication information identifies that first UE is paged by the base station, wherein the first CORSET comprises a plurality of PDCCHs, and the plurality of PDCCHs comprised in the first CORSET carry the first DCI; and acquire a paging message sent by the base station to the first UE according to the first DCI, wherein a timing index of the first beam corresponds to a timing index of the second beam.

According to a seventh aspect of the embodiments of the present disclosure, there is provided a computer-readable storage medium in which a computer program is stored, wherein any one of the information transmission methods in the first aspect is implemented when the stored computer program is executed by a processing component; or any one of the information transmission methods in the second aspect is implemented when the stored computer program is executed by the processing component.

The technical solutions of the embodiments of the present disclosure have the following advantageous effects:

The base station sends the SSB and the paging indication information through the first beam, wherein the paging indication information is configured to identify the UE paged by the base station in the cell served by the base station, so that the first UE can acquire the SSB only by monitoring the first beam, and thus determine whether it is paged by the base station. In addition, the first UE does not need to monitor the second beam unless the first UE determines that it is paged by the base station. In this way, monitoring duration of the first UE is reduced, thereby reducing power consumption of the first UE.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure will be described in further detail with reference to the accompanying drawings, to present the objects, technical solutions, and advantages of the present disclosure more clearly.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

In order to make the technical solutions provided by the embodiments of the present disclosure easy to understand, the technical concepts involved in the embodiments of the present disclosure will be explained below.

1. Beam

In a current communication system, electromagnetic waves of omnidirectional radiation are emitted by a base station, wherein only electromagnetic waves radiated towards UE (User Equipment) can provide a service for the UE, while electromagnetic waves radiated in other directions cannot provide a service for the UE, resulting in serious waste of resources.

In a 5G communication system, the base station can emit electromagnetic waves narrow in lobes and radiated to a specific direction (towards the UE) by using the beamforming technology, so that the electromagnetic waves of omnidirectional radiation can be converted into electromagnetic waves of precise directivity, thereby avoiding waste of the resources.

Figure 1:
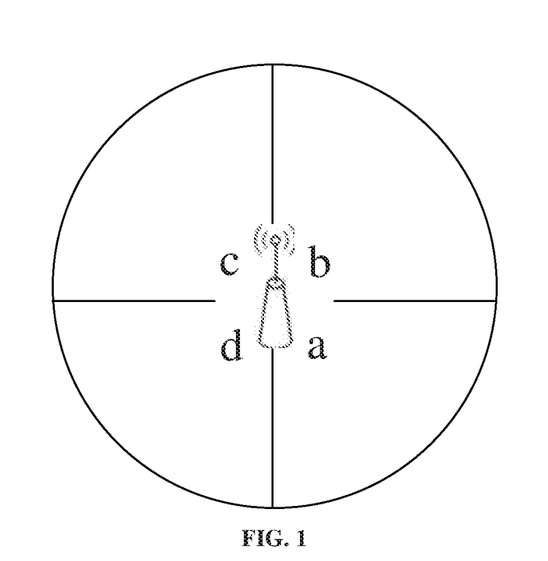
FIG. 1 shows a beam used by a base station to cover a cell served by the base station according to an exemplary embodiment.

The electromagnetic waves emitted by the base station, narrow in lobes and radiated to the specific direction may also be referred to as a beam, 2. Beam Sweeping In an actual application, the base station usually needs to use a plurality of beams in different radiation directions to completely cover a cell that the base station serves. For example, as shown in FIG. 1, the base station needs to use four beams, namely, a, b, c, and d, to completely cover the cell that the base station serves, wherein the four beams have different radiation directions and the same lobe width, namely beam width, of 90°.

When the base station needs to send certain information to the UE in a cell that the base station serves, the base station can send the certain information by using beams in a plurality of different radiation directions sequentially. This process is also referred to as beam sweeping. For example, in FIG. 1, the base station can send the above information by using the beams a, b, c, and d sequentially.

3. SSB (Synchronization Signal Block) and RMSI (Remaining System Information)

The SSB is periodically sent by the base station, and includes a PSS (Primary Synchronization Signal), an SSS (Secondary Synchronization Signal), system information, and location indication information, wherein the system information and the location indication information are transmitted on a PBCH (Physical Broadcast Channel). In addition, the SSB may further include a DMRS (Demodulation Reference Signal) for demodulating the PBCH.

In an actual application, when not residing in or accessing a certain cell (for example, when the UP is just started), the UP can receive the SSB, and can be synchronized with the base station in time and frequency according to the PSS and the SSS in the SSB. After that, the UP can use the DMRS in the SSB to decode the PBCH to acquire system information carried on the PBCH, wherein the system information is required for the UE to randomly access the base station. However, due to the limited capacity of the PBCH, the system information included in the SSB is only a part of all system information required for the UE to randomly access the base station, and may include an MIB (Master Information Block). The other part of the all system information required for the UE to randomly access the base station is included in the RMSI, wherein the RMSI is periodically sent by the base station, and is transmitted through a PDSCH (Physical Downlink Shared Channel). Thus, in order to randomly access the base station, the UE further needs to acquire the RMSI in the PDSCH according to the location indication information in the SSB. After acquiring the system information in the SSB and the RMSI, the UP can randomly access the base station according to the system information in the SSB and the RMSI.

In addition, when the UP has resided in or accessed a certain cell, in order to support the mobility of the UE, the UP needs to periodically search for a neighboring cell. When searching for the neighboring cell, the UE needs to receive the SSB, and measures the signal quality of the PSS and the SSS in the SSB according to the latest detected cell reference signal so as to determine whether to reselect a cell. When searching for the neighboring cell, the UE does not need to acquire the system information carried on the PBCH, and does not need to acquire the RMSI again as the UE has been accessed in the base station.

4. CORSET (Control Resource Set)

In the 5G communication system, a CORSET refers to a downlink resource including a plurality of PDCCHs (Physical Downlink Control Channels). Generally, the time domain of one CORSET may be 1 to 3 OFDM (Orthogonal Frequency Division Multiplexing) symbol(s); and the frequency domain may be frequency domains of N PRBs (Physical Resource Blocks), wherein N is a positive integer greater than or equal to 1.

5. PDCCH

The PDCCH carries DCI (Downlink Control Information). In an actual application, the UE needs to acquire the DCI carried in the PDCCH, so as to acquire the information of the UE from the PDSCH in a time domain location and a frequency domain location indicated by the DCI, wherein the PDSCH can generally carry a paging message, the SSB, and the like.

6. Paging Message

The paging message is configured to page the UE, for example, to notify the paged UE to receive the paging request, or notify the paged UE to update the system information, or notify the paged UE to receive alarm information such as earthquake and tsunami warning information.

Figure 2:
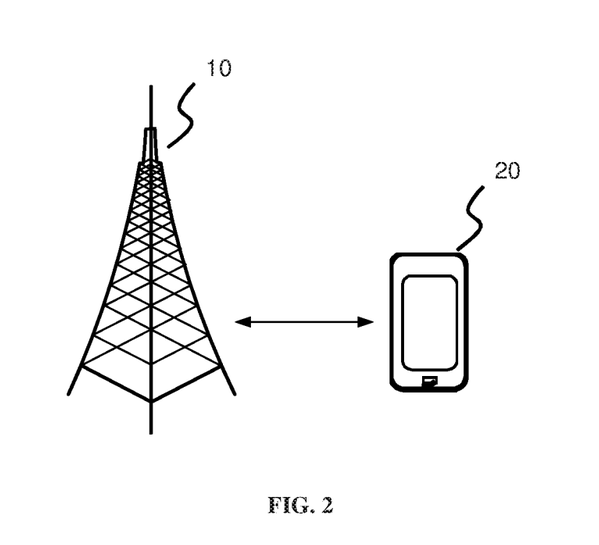
FIG. 2 is a schematic diagram of an implementation environment according to an exemplary embodiment.

An implementation environment involved in the embodiments of the present disclosure will be described below. As shown in FIG. 2, the implementation environment involved in the embodiments of the disclosure includes a base station 10 and first UE 20 which can be connected through a communication network, wherein the first UE 20 is any one of UEs in a cell served by the base station 10.

Figure 3:
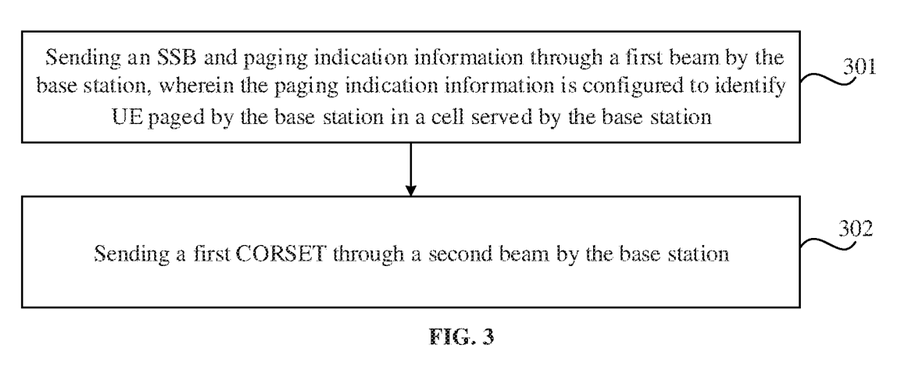
FIG. 3 is a flow chart of an information transmission method according to an exemplary embodiment.

FIG. 3 is a flow chart of an information transmission method according to an exemplary embodiment. As shown in FIG. 3, the information transmission method is applied to the base station 10 shown in FIG. 2, and includes the following steps.

In step 301, the base station sends an SSB and paging indication information through a first beam, wherein the paging indication information is configured to identify UE paged by the base station in a cell served by the base station.

In step 302, the base station sends a first CORSET through a second beam, wherein the first CORSET includes a plurality of PDCCHs; the plurality of PDCCHs included in the first CORSET carry first DCI which is configured to instruct the UE paged by the base station to acquire a paging message according to the first DCI; and a timing index of the first beam corresponds to that of the second beam.

In summary, in the information transmission method provided by the embodiment of the present disclosure, the base station sends the SSB and the paging indication information through the first beam, wherein the paging indication information is configured to identify the UE paged by the base station in the cell served by the base station, so that the first UE can acquire the SSB only by monitoring the first beam, and thus determine whether it is paged by the base station. In addition, the first UE does not need to monitor the second beam unless the first UE determines that it is paged by the base station. In this way, monitoring duration of the first UE is reduced, thereby reducing power consumption of the first UE.

Figure 4:
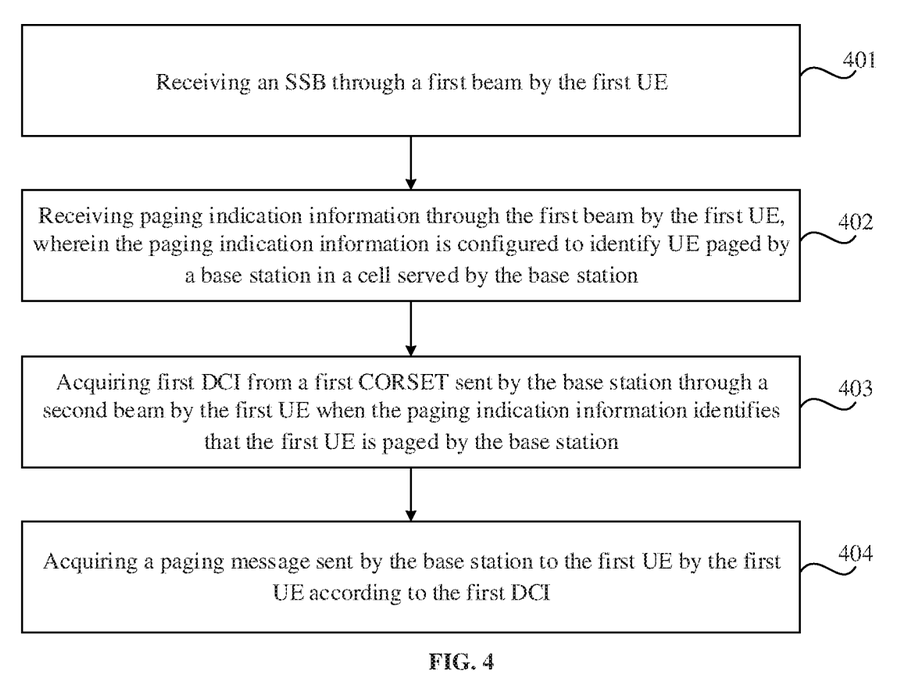
FIG. 4 is a flow chart of an information transmission method according to another exemplary embodiment.

FIG. 4 is a flow chart of an information transmission method according to another exemplary embodiment. As shown in FIG. 4, the information transmission method is applied to the first UE 20 shown in HG. 2, and includes the following steps.

In step 401, the first UE receives an SSB through a first beam.

In step 402, the first UE receives paging indication information through the first beam, wherein the paging indication information is configured to identify UE paged by a base station in a cell served by the base station.

In step 403, when the paging indication information identifies that the first UE is paged by the base station, the first UE acquires first DCI from a first CORSET sent by the base station through a second beam, wherein the first CORSET includes a plurality of PDCCHs, and the plurality of PDCCHs included in the first CORSET carry the first DO.

In step 404, the first UE acquires a paging message sent by the base station to the first UE according to the first DCI.

A timing index of the first beam corresponds to that of the second beam.

In summary, in the information transmission method provided by the embodiment of the present disclosure, the first UE receives the SSB and the paging indication information through the first beam, wherein the paging indication information is configured to identify the UE paged by the base station in the cell served by the base station, so that the first UE can acquire the SSB only by monitoring the first beam, and thus determine whether it is paged by the base station. In addition, the first UE does not need to monitor the second beam unless the first UE determines that it is paged by the base station. In this way, monitoring duration of the first UE is reduced, thereby reducing power consumption of the first UE.

Figure 5:
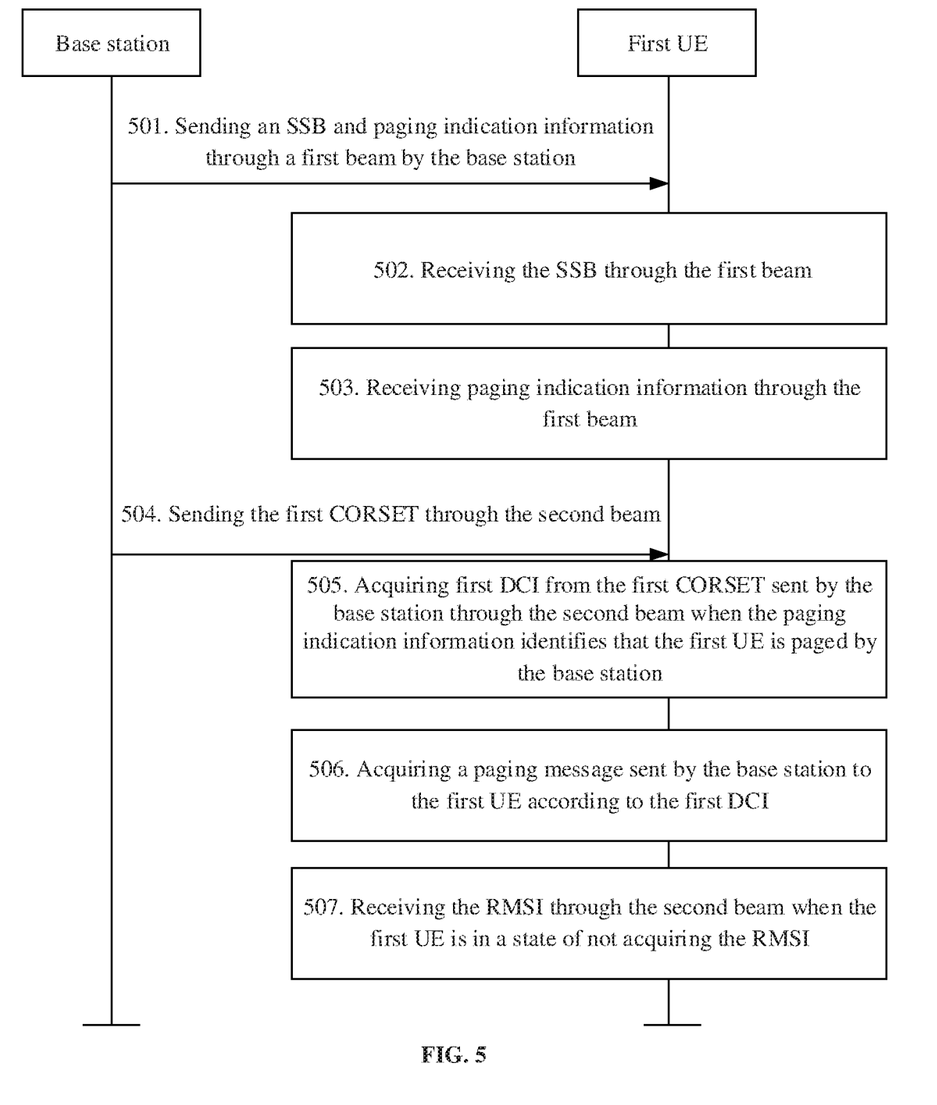
FIG. 5 is a flow chart of yet an information transmission method according to another exemplary embodiment.

FIG. 5 is a flow chart of an information transmission method according to another exemplary embodiment. As shown in FIG. 5, the information transmission method is applied to the implementation environment shown in FIG. 2, and includes the following steps.

In step 501, the base station sends an SSB and paging indication information through a first beam, wherein the paging indication information is configured to identify UE paged by the base station in a cell served by the base station.

In the embodiment of the present disclosure, the base station can send the SSB and the paging indication information through beam sweeping. That is, the base station can send the SSB and the paging indication information by using a plurality of beams in different radiation directions sequentially. For example, as shown in FIG. 1, the base station can sequentially send the SSB and the paging indication information through the beams a, b, c, and d, respectively. The first beam in the embodiment of the present disclosure may refer to any one of a plurality of beams in different radiation directions involved in a beam sweeping process of sending of the SSB and the paging indication information. For example, as shown in FIG. 1, the first beam in the embodiment of the present disclosure may refer to any one of the beams a, b, c, and d.

In an actual application, the base station may transmit the paging indication information in the first beam through a non-scheduled physical channel, or may transmit the paging indication information through a PDCCH, wherein the non-scheduled physical channel refers to a physical channel except for the PDCCH.

If the base station transmits the paging indication information through the non-scheduled physical channel, the paging indication information may include a plurality of fields. Each field may correspond to a group of UEs in the cell served by the base station, and is configured to identify whether UE paged by the base station exists in the group of UEs corresponding to the field. For example, the field "00" in the paging indication information can identify that the UE paged by the base station does not exist in the group of UEs corresponding to this field.

If the base station transmits the paging indication information through the PDCCH, the base station can send a third CORSET through the first beam. The third CORSET includes a plurality of PDCCHs, wherein at least one third DCI is carried in the plurality of PDCCHs included in the third CORSET, and can identify whether each of the plurality of UEs in the cell served by the base station is paged by the base station.

It should be noted that in one embodiment of the present disclosure, a frequency domain of the SSB may be different from that of the paging indication information.

The SSB and the paging indication information are sent on the same beam (namely, the first beam), so that the first UE can acquire the SSB only by monitoring the first beam, and thus determine whether it is paged by the base station. In addition, the first UE does not need to monitor the second beam unless the first UE determines that it is paged by the base station. In this way, monitoring duration of the first UE is reduced compared to sending the SSB and the paging indication information through different beams, thereby reducing power consumption of the first UE.

In step 502, the first UE receives the SSB through the first beam.

It should be noted that since the radiation of the beam is directional, the first UE may be the UE pointed by the radiation direction of the first beam. For example, as shown in FIG. 1, if the first beam is the beam a, the first UE is the UE pointed by the radiation direction of the beam a, that is, the first UE is the UE in a sector corresponding to the beam a in FIG. 1.

As described above, the first UE can receive the SSB when it does not reside in or access the cell served by the base station. In this case, the first UE needs to acquire the PSS, the SSS, the system information, and the location indication information in the SSB. In addition, the first UE may also receive the SSB when searching for the neighboring cell. In this case, the first UE only needs to acquire the PSS and the SSS without parsing the system information and the location indication information in the SSB transmitted on the PBCH.

In step 503, the first UE receives paging indication information through the first beam.

Corresponding to the two manners that the base station sends the paging indication information in step 501, the first UE can receive the paging indication information through two manners.

In the first manner, when the base station transmits the paging indication information through the non-scheduled physical channel, the first UE can receive the paging indication information through the non-scheduled physical channel. Then, the first UE can acquire a field corresponding to a UE group of the first UE in the paging indication information, and thus determine whether the first UE has the possibility of being paged by the base station according to the field. That is, when the field acquired by the first UE identifies that the UE group of the first UE does not include the UE paged by the base station, the first UE can determine that it is not paged by the base station; when the field acquired by the first UE identifies that the UE group of the first UE includes the UE paged by the base station, the first UE may determine that it has the possibility of being paged by the base station.

In the second manner, when the base station transmits the paging indication information through the PDCCH, the first UE can perform blind detection on a plurality of PDCCHs in the third CORSET sent by the base station through the first beam to acquire one piece of third DCI configured to identify whether the first. UE is paged by the base station in the third CORSET, and the first UE can determine whether it is paged by the base station according to the acquired third DCI.

In an actual application, usually, the base station will not page the first UE until the first UE accesses the base station. That is, usually, the first UE does not need to acquire the paging indication information until it accesses the base station. Thus, the first UE usually has acquired the system information in the SSB and RMSI required by the random access of the base station when acquiring the paging indication information. In an embodiment of the present disclosure, when the base station transmits the paging indication information through the PDCCH, the RMSI may include the second location indication information, wherein the second location indication information can identify a frequency domain location of the third CORSET. Thus, when receiving the paging indication information transmitted by the base station through the PDCCH, the first UE can determine a frequency domain location of the third CORSET based on the second location indication information included in the RMSI that has been acquired by the first UE. Then, the first UE can position the third CORSET according to the frequency domain location of the third CORSET, and performs blind detection on the plurality of PDCCHs included in the third CORSET to acquire the third DCI configured to identify whether the first UE is paged by the base station in the third CORSET.

In step 504, the base station sends the first CORSET through the second beam.

In the embodiment of the present disclosure, after sending the SSB and the paging indication information, the base station can send the first CORSET by beam sweeping, wherein the second beam in the embodiment of the present disclosure may refer to one of the plurality of beams of different radiation directions involved in the beam sweeping process of sending of the first CORSET, and an timing index of the second beam corresponds to that of the first beam.

The timing index of the beam may be configured to identify the radiation direction and the sending time of the beam. The tinting index of the first beam corresponding to that of the second beam means that the radiation direction identified by the timing index of the first beam is the same as the radiation direction identified by the timing index of the second beam, and a difference value between the sending time identified by the timing index of the first beam and the sending time identified by the timing index of the second beam is equal to a preset value which can be pre-allocated by the base station.

The first CORSET includes a plurality of PDCCHs, wherein the plurality of PDCCHs included in the first CORSET may only carry the first DCI, or may carry both the first DCI and the second DCI. The first DCI is configured to instruct the UE paged by the base station to acquire a paging message sent by the base station to the UE from the PDSCH according to the first DCI. The second DCI is configured to instruct the UE in the cell served by the base station to acquire RMSI from the PDSCH according to the second DCI.

If the plurality of PDCCHs included in the first CORSET only carry the first DCI, in addition to the first CORSET, the base station can send the RMSI, a paging message set and a second CORSET through the second beam. The first CORSET, the RMSI, the second CORSET, and the paging message set have different frequency domains. The paging message set includes a paging message sent by the base station to at least one UE paged by the base station, and is transmitted on the PDSCH. The second CORSET includes a plurality of PDCCHs, and the plurality of PDCCHs included in the second CORSET carry the second DCI.

If the plurality of PDCCHs included in the first CORSET carry both the first DCI and the second DCI, in addition to the first CORSET, the base station can send the RMSI and the paging message set through the second beam. The first CORSET, the RMSI, and the paging message set have different frequency domains.

As the first CORSET, the second CORSET, the RMSI and the paging message set are sent in different frequency domains through the second beam, or the first CORSET, the RMSI, and the paging message set are sent in different frequency domains through the second beam, the base station can send the RMSI and the paging message set through only one beam. Thus, compared with the manner of sending the RMSI and the paging message set through a plurality of beams, the beam sweeping time of the base station is shortened, thereby saving time domain resources.

In addition, by enabling the plurality of PDCCHs included in the first CORSET to carry both the first DCI and the second. DCI, the base station can send two types of DCIs through one CORSET. Compared with the manner of sending the two types of DCIs through the first CORSET and the second CORSET with the different frequency domain locations, respectively, frequency domain resources are saved.

In step 505, when the paging indication information identifies that the first UE is paged by the base station, the first UE acquires first DCI from the first CORSET sent by the base station through the second beam.

In an embodiment of the present disclosure, when the base station transmits the paging indication information through a non-control channel, that is, when the paging indication information includes a plurality of fields, and each field corresponds to a group of UEs in the cell served by the base station, "the page indication information identifies that the first UE is paged by the base station" in step 505 is that the field corresponding to the UE group of the first UE in the paging indication information identifies that the UE paged by the base station exists in the UE group. When the base station transmits the paging indication information through the PDCCH, that is, when the paging indication information is the third DCI, "the page indication information identifies that the first UE is paged by the base station" in step 505 is that one piece of third DCI identifies that the first UE is paged by the base station.

When the paging indication information identifies that the first UE is paged by the base station, the first UE can execute the technical process in steps 505 and 506. In step 505, the first UE can perform blind detection on the plurality of PDCCHs in the first CORSET sent by the base station through the second beam to acquire the first DCI configured to instruct the first UE to acquire the paging message in the first CORSET.

In order to perform blind detection on the plurality of PDCCHs in the first CORSET, the first UE needs to position the first CORSET. That is, the first UE needs to acquire a time domain location and a frequency domain location of the first CORSET, wherein the time domain location of the first CORSET is that of the second beam.

When the plurality of PDCCHs included in the first CORSET only carry the first DCI, the RMSI may include first location indication information. The first location indication information can identify the time domain location and the frequency domain location of the first CORSET. Thus, when the paging indication information identifies that the first UE is paged by the base station, the first UE can determine the time domain location and the frequency domain location of the first CORSET based on the first location indication information included in the RMSI acquired by the first UE. Then, the first UE can position the first CORSET according to the time domain location and the frequency domain location of the first CORSET.

When the plurality of PDCCHs included in the first CORSET carry both the first DCI and the second DCI, the RMSI may include CORSET indication information. The CORSET indication information can identify that the plurality of PDCCHs included in the first CORSET carry the first DCI and the second DCI simultaneously. When the first UE detects the CORSET indication information from the RMSI acquired by the first UE, the first UE can determine that the time domain location and the frequency domain location of the first CORSET are the same as the time domain location and the frequency domain location indicated by the location indication information included in the SSB. The location indication information included in the SSB is configured to indicate that the plurality of included PDCCHs carry the time domain location and the frequency domain location of the CORSET of the second DCI. In this case, the first UE can position the first CORSET according to the location indication information in the SSB.

In step 506, the first UE acquires a paging message sent by the base station to the first UE according to the first DCI.

The first UE can acquire the paging message sent by the base station to the first UE from a paging message set sent by the base station through the second beam according to the first DCI. The second beam may be a beam for sending the first. CORSET, the paging message set, and the RMSI, or may be a beam for sending the first CORSET, the second CORSET, the paging message set, and the RMSI.

In step 507, when the first UE is in a state of not acquiring the RMSI, the first receives the RMSI through the second beam.

"The first UE is in the state of not acquiring the RMSI" may refer to a state in which the first UE does not reside in or access the cell served by the base station. As described above, when the first UE is in a state of not residing in or accessing the cell served by the base station, the first UE needs to acquire the PSS, the SSS, the system information, and the location indication information in the SSB, wherein the location indication information is configured to indicate that the plurality of included PDCCHs carry the time domain location and the frequency domain location of the CORSET of the second DCI. That is, when the plurality of PDCCHs included in the first CORSET carry the second DCI, the location indication information in the SSB can indicate the time domain location and the frequency domain location of the first CORSET. When the plurality of PDCCHs included in the second CORSET carry the second DCI, the location indication information in the SSB can indicate the time domain location and the frequency domain location of the second CORSET.

According to the location indication information in the SSB, the first UE can position the first CORSET or the second CORSET, and can perform blind detection on the plurality of PDCCHs included in the first CORSET or the plurality of PDCCHs included in the second. CORSET to acquire the second DCI. Then, the first UE can acquire the RMSI according to the second DCI.

When being in the state of not acquiring the RMSI, the first UE can acquire the location indication information from the SSB sent by the base station through the first beam. The location indication information is configured to indicate that the plurality of included PDCCHs carry the time domain location and the frequency domain location of the CORSET of the second DCI. That is, when the plurality of PDCCHs included in the first CORSET carry the second DCI, the location indication information in the SSB indicates the time domain location and the frequency domain location of the first CORSET.

In summary, in the information transmission method provided by the embodiment of the present disclosure, the base station sends the SSB and the paging indication information through the first beam, wherein the paging indication information is configured to identify the UE paged by the base station in the cell served by the base station, so that the first UE can acquire the SSB only by monitoring the first beam, and thus determine whether it is paged by the base station. In addition, the first UE does not need to monitor the second beam unless the first UE determines that it is paged by the base station. In this way, monitoring duration of the first UE is reduced, thereby reducing power consumption of the first UE.

Figure 6:
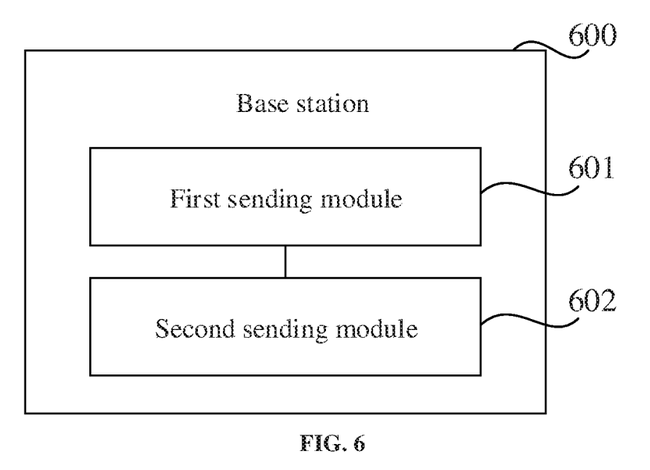
FIG. 6 is a block diagram of the base station according to an exemplary embodiment.

FIG. 6 is a block diagram of a base station 600 according to an exemplary embodiment. Referring to FIG. 6, the base station 600 includes a first sending module 601 and a second sending module 602.

The first sending module 601 is configured to send a synchronization signal block (SSB) and paging indication information through a first beam, wherein the paging indication information is configured to identify user equipment (UE) paged by the base station in a cell served by the base station.

The second sending module 602 is configured to send a first control resource set (CORSET) through a second beam, wherein the first CORSET includes a plurality of physical downlink control channels (PDCCHs); first downlink control information (DCI) is carried in the PDCCHs included in the first CORSET, and is configured to instruct the UE paged by the base station to acquire a paging message according to the first DO; and a timing index of the first beam corresponds to that of the second beam.

In an embodiment of the present disclosure, the plurality of PDCCHs included in the first CORSET further carry second DCI, wherein the second DCI is configured to instruct the UE in the cell to acquire remaining system information (RMSI) according to the second DCI.

In an embodiment of the present disclosure, the second sending module 602 is further configured to send the RMSI and a paging message set through the second beam, wherein the paging message set includes a paging message sent by the base station to at least one UE paged by the base station; and the first CORSET, the RMSI, and the paging message set have different frequency domains.

In an embodiment of the present disclosure, the RMSI includes CORSET indication information, wherein the CORSET indication information is configured to identify that the plurality of PDCCHs in the first CORSET carry the first DCI and the second DCI.

In an embodiment of the present disclosure, the second sending module 602 is further configured to send the RMSI, the second CORSET and the paging message set through the second beam. The first CORSET, the RMSI, the second CORSET and the paging message set have different frequency domains. The second CORSET includes a plurality of PDCCHs. The plurality of PDCCHs included in the second CORSET carry second DCI, wherein the second DCI is configured to instruct the UE in the cell to acquire the RMSI according to the second DCI. The paging message set includes a paging message sent by the base station to at least one UE paged by the base station.

In an embodiment of the present disclosure, the RMSI includes first location indication information, wherein the first location indication information is configured to identify the time domain location and the frequency domain location of the first CORSET.

In an embodiment of the present disclosure, the paging indication information is transmitted on a non-scheduled physical channel.

In an embodiment of the present disclosure, the paging indication information is third DCI carried on a plurality of PDCCHs included in third CORSET.

In an embodiment of the present disclosure, the second sending module 602 is further configured to send RMSI, wherein the RMSI includes second location indication information configured to identify a frequency domain location of the third CORSET.

In summary, the base station provided by the embodiment of the present disclosure sends the SSB and the paging indication information through the first beam, wherein the paging indication information is configured to identify the UE paged by the base station in the cell served by the base station, so that the first UE can acquire the SSB only by monitoring the first beam, and thus determine whether it is paged by the base station. In addition, the first UE does not need to monitor the second beam unless the first UE determines that it is paged by the base station. In this way, monitoring duration of the first UE is reduced, thereby reducing power consumption of the first UE.

With respect to the apparatus in the above embodiments, the specific manners for individual modules in the apparatus to perform operations have been described in detail in the embodiments of the related methods, and will not be elaborated herein.

Figure 7:
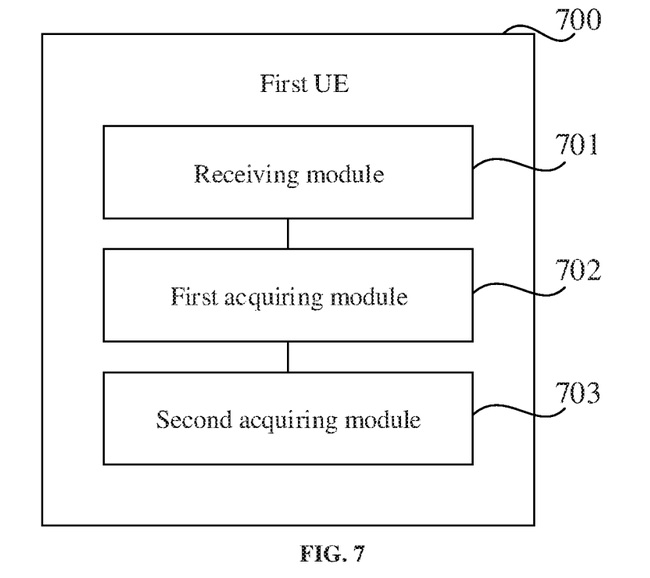
FIG. 7 is a block diagram of first UE according to an exemplary embodiment.

FIG. 7 is a block diagram of first UE 700 according to an exemplary embodiment. Referring to FIG. 7, the first UE 700 includes a receiving module 701, a first acquiring module 702, and a second acquiring module 703.

The receiving module 701 is configured to receive an SSB through a first beam.

The receiving module 701 is further configured to receive paging indication information through the first beam, wherein the paging indication information is configured to identify UE paged by a base station in a cell served by the base station.

The first acquiring module 702 is configured to acquire first DCI from a first CORSET sent by the base station through a second beam when the paging indication information identifies that the first UE is paged by the base station, wherein the first CORSET includes a plurality of PDCCHs, and the plurality of PDCCHs included in the first CORSET carry the first DCI.

The second acquiring module 703 is configured to acquire a paging message sent by the base station to the first UE according to the first DCI, wherein a timing index of the first beam corresponds to a timing index of the second beam.

In an embodiment of the present disclosure, the plurality of PDCCHs included in the first CORSET further carry second DCI, wherein the second DCI is configured to instruct the UE in the cell to acquire RMSI according to the second DCI.

In an embodiment of the present disclosure, the first acquiring module 702 is further configured to acquire the second DCI from the first CORSET sent by the base station through the second beam when the first UE is in a state of not acquiring RMSI.

The second acquiring module 703 is further configured to acquire the RMSI through the second beam according to the second DCI, wherein the RMSI and the first CORSET have different frequency domains.

In an embodiment of the present disclosure, the second acquiring module 703 is configured to acquire a paging message sent by the base station to the first UE from a paging message set sent by the base station through the second beam according to the first DCI, wherein the paging message set includes the paging message sent by the base station to at least one UE paged by the base station; and the paging message set, the RMSI, and the first CORSET have different frequency domains.

In an embodiment of the present disclosure, the RMSI includes CORSET indication information, wherein the CORSET indication information is configured to identify that at least one of the first DCI and the second DCI are carried in the plurality of PDCCHs in the first CORSET.

In an embodiment of the present disclosure, the first acquiring module 702 is further configured to acquire second DCI from the second CORSET sent by the base station through the second beam when the first. UE is in a state of not acquiring the RMSI, wherein the second CORSET includes a plurality of PDCCHs, and the plurality of PDCCHs included in the second CORSET carry the second DCI.

The second acquiring module 703 is further configured to acquire the RMSI through the second beam according to the second DCI, wherein the first CORSET, the RMSI, and the second CORSET have different frequency domains.

In an embodiment of the present disclosure, the second acquiring module 703 is configured to acquire a paging message sent by the base station to the first UE from a paging message set sent by the base station through the second beam according to the first DCI, wherein the paging message set includes the paging message sent by the base station to the at least one UE paged by the base station; and the paging message set, the RMSI, the first CORSET, and the second CORSET have different frequency domains.

In an embodiment of the present disclosure, the RMSI includes first location indication information, wherein the first location indication information is configured to identify the time domain location and the frequency domain location of the first CORSET.

In an embodiment of the present disclosure, the receiving module 701 is configured to receive the paging indication information on the non-scheduled physical channel through the first beam.

In an embodiment of the present disclosure, the receiving module 701 is configured to acquire third DCI as the paging indication information from a third CORSET sent by the base station through the first beam, wherein the third CORSET includes a plurality of PDCCHs, and the plurality of PDCCHs included in the third CORSET carry the third DCI.

In an embodiment of the present disclosure, the receiving module 701 is further configured to receive RMSI, wherein the RMSI includes second location indication information configured to identify a frequency domain location of the third CORSET.

In summary, the first UE provided by the embodiment of the present disclosure receives the SSB and the paging indication information through the first beam, wherein the paging indication information is configured to identify the UE paged by the base station in the cell served by the base station, so that the first UE can acquire the SSB only by monitoring the first beam, and thus determine whether it is paged by the base station. In addition, the first UE does not need to monitor the second beam unless the first UE determines that it is paged by the base station. In this way, monitoring duration of the first UE is reduced, thereby reducing power consumption of the first UE.

With respect to the apparatus in the above embodiments, the specific manners for individual modules in the apparatus to perform operations have been described in detail in the embodiments of the related methods, and will not be elaborated herein.

Figure 8:
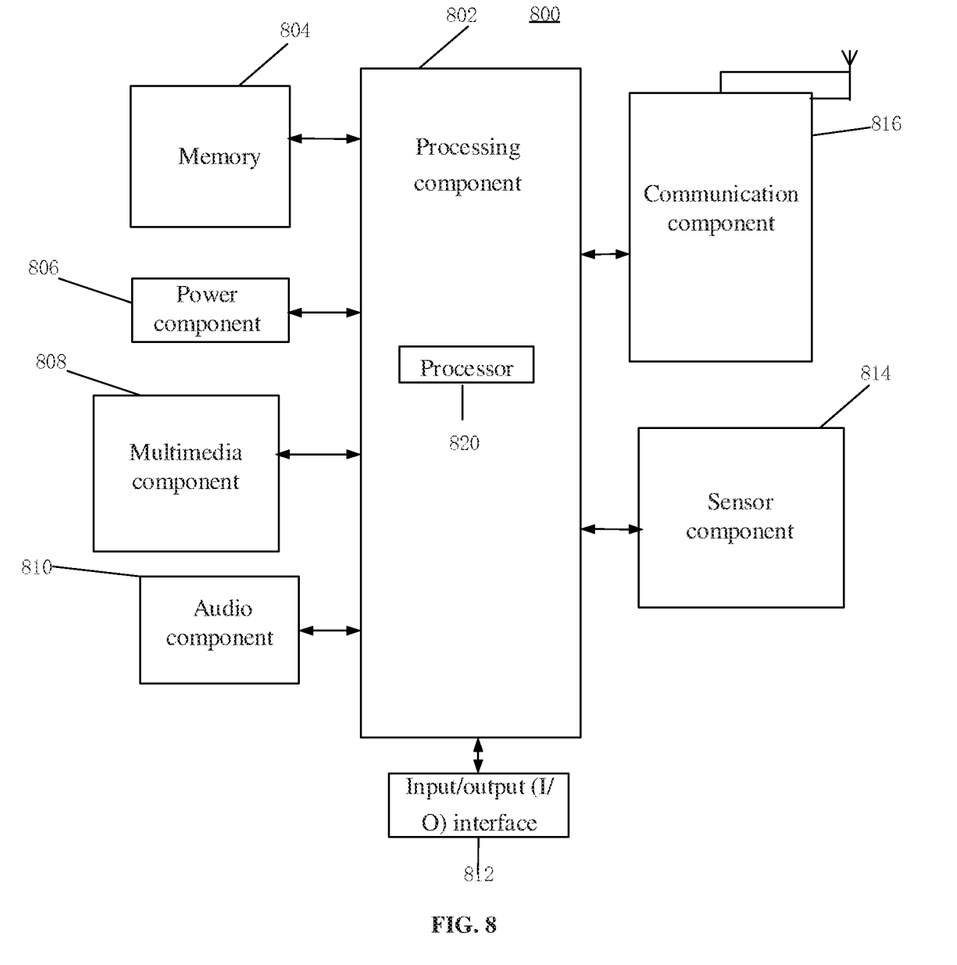
FIG. 8 is a block diagram of an information transmission apparatus according to an exemplary embodiment.

FIG. 8 is a block diagram of an information transmission apparatus 800 in accordance with an exemplary embodiment. For example, the information transmission apparatus 800 may be a mobile phone, a computer, a digital broadcast terminal, a messaging device, a gaming console, a tablet device, a medical device, a fitness equipment, a personal digital assistant, and the like.

Referring to FIG. 8, the information transmission apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of the apparatus 800, such as the operations associated with display, telephone calls, data communication, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, videos, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power for the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals front the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 808 includes a front camera and/or a rear camera. The front camera and/or the rear camera may receive external multimedia data while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive external audio signals when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a start button, and a lock button.

The sensor component 814 includes one or more sensors to provide status assessments of various aspects of the apparatus 800. For instance, the sensor component 814 may detect an on/off status of the apparatus 800, relative positioning of components, e.g., the display device and the mini keyboard of the apparatus 800, and the sensor component 814 may also detect a position change of the apparatus 800 or a component of the apparatus 800, presence or absence of user contact with the apparatus 800, orientation or acceleration/deceleration of the apparatus 800, and temperature change of the apparatus 800. The sensor component 814 may include a proximity sensor configured to detect the presence of nearby objects without any physical contact. The sensor component 814 may also include a light sensor, such as a CMOS or CCD image sensor, used for imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In an exemplary embodiment, the communication component 816 receives broadcast signals or broadcast associated information from an external broadcast management system via a broadcast channel. In an exemplary embodiment, the communication component 816 further includes a near field communication (NFC) module to facilitate short-range communication. For example, the communication component 816 may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 804 including instructions, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

Figure 9:
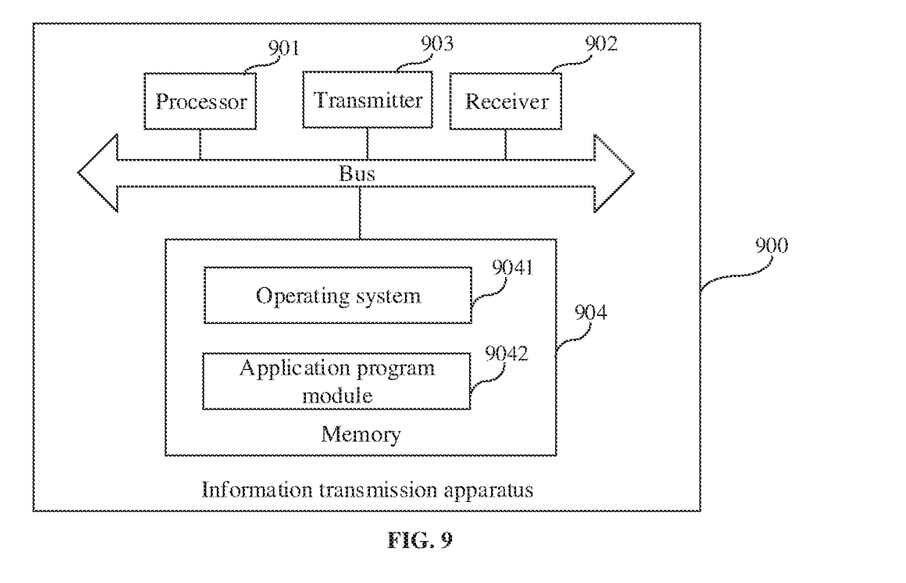
FIG. 9 is a block diagram of an information transmission apparatus according to another exemplary embodiment.

FIG. 9 is a block diagram of an information transmission apparatus 900 according to an exemplary embodiment. For example, the information transmission apparatus 900 may be a base station. As shown in FIG. 9, the information transmission apparatus 900 may include a processor 901, a receiver 902, a transmitter 903, and a memory 904. The receiver 902, the transmitter 903, and the memory 904 are respectively connected to the processor 901 through a bus.

The processor 901 includes one or more processing cores, and executes the method executed by the base station in the information transmission method provided by the embodiment of the present disclosure by running a software program and a module. The memory 904 can be configured to store the software program and the module. Particularly, the memory 904 can store an operating system 9041, and an application program module 9042 required by at least one function. The receiver 902 is configured to receive communication information sent by other equipment. The transmitter 903 is configured to send the communication information to the other equipment through beam sweeping.

In an exemplary embodiment, there is further provided a computer-readable storage medium in which a computer program is stored. The computer program can implement an information transmission method when being executed by a processor. For example, the information transmission method may include: sending a synchronization signal block (SSB) and paging indication information through a first beam, wherein the paging indication information is configured to identify user equipment (UE) paged by the base station in a cell served by the base station; sending a first control resource set (CORSET) through a second beam, wherein the first CORSET includes a plurality of physical downlink control channels (PDCCHs), first downlink control information (DCI) is carried in the PDCCHs included in the first CORSET, and is configured to instruct the UE paged by the base station to acquire a paging message according to the first DCI, and a timing index of the first beam corresponds to a timing index of the second beam. Or, the information transmission method may include: receiving an SSB through a first beam; receiving paging indication information through the first beam, wherein the paging indication information is configured to identify UE paged by a base station in a cell served by the base station; acquiring first DCI from a first CORSET sent by the base station through a second beam when the paging indication information identifies that first UE is paged by die base station, wherein the first CORSET includes a plurality of PDCCHs, and the plurality of PDCCHs included in the first CORSET carry the first DCI; and acquiring a paging message sent by the base station to the first UE according to the first DCI, wherein a timing index of the first beam corresponds to a timing index of the second beam.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing front the scope thereof. It is intended that the scope of the present disclosure only be limited by the appended claims.

The invention claimed is:

1. An information transmission method, comprising:
sending a synchronization signal block (SSB) and paging indication information through a first beam, wherein the paging indication information is configured to identify user equipment (UE) paged by a base station in a cell served by the base station; and
sending a first control resource set (CORSET) through a second beam, wherein the first CORSET comprises a plurality of physical downlink control channels (PDCCHs), the plurality of PDCCHs comprised in the first CORSET carry first downlink control information (DCI) configured to instruct the UE paged by the base station to acquire a paging message according to the first DCI,
wherein a timing index of the first beam corresponds to a timing index of the second beam,
wherein the method further comprises one of:
sending remaining system information (RMSI) and a paging message set through the second beam, wherein the paging message set comprises a paging message sent by the base station to at least one UE paged by the base station; the first CORSET, the RMSI, and the paging message set have different frequency domains; and the plurality of PDCCHs comprised in the first CORSET further carry second DCI configured to instruct the UE in the cell to acquire the RMSI according to the second DCI: or
sending RMSI, a second CORSET and a paging message set through the second beam, wherein the first CORSET, the RMSI, the second CORSET and the paging message set have different frequency domains; the second CORSET comprises a plurality of PDCCHs carrying second DCI configured to instruct the UE in the cell to acquire the RMSI according to the second DCI; and the paging message set comprises a paging message sent by the base station to at least one UE paged by the base station.

2. The method according to claim 1, wherein the second DCI is carried in the plurality of PDCCHs comprised in the first CORSET, and the RMSI comprises CORSET indication information configured to identify that the plurality of PDCCHs in the first CORSET carry the first DCI and the second DCI.

3. The method according to claim 1, wherein the second DCI is carried in the plurality of PDCCHs comprised in the second CORSET, and the RMSI comprises first location indication information configured to identify a time domain location and a frequency domain location of the first CORSET.

4. The method according to claim 1, wherein the paging indication information is transmitted on a non-scheduled physical channel.

5. The method according to claim 1, wherein the paging indication information is third DCI carried on a plurality of PDCCHs comprised in a third CORSET.

6. The method according to claim 5, further comprising:
sending RMSI, wherein the RMSI comprises second location indication information configured to identify a frequency domain location of the third CORSET.

7. An information transmission method, comprising:
receiving a synchronization signal block (SSB) through a first beam;
receiving paging indication information through the first beam, wherein the paging indication information is configured to identify user equipment (UE) paged by a base station in a cell served by the base station;
acquiring first downlink control information (DCI) from a first control resource set (CORSET) sent by the base station through a second beam when the paging indication information identifies that first UE is paged by the base station, wherein the first CORSET comprises a plurality of physical downlink control channels (PDCCHs), and the plurality of PDCCHs comprised in the first CORSET carry the first DCI; and acquiring a paging message sent by the base station to the first UE according to the first DCI, wherein a timing index of the first beam corresponds to a timing index of the second beam, wherein the method further comprises one of:

acquiring second DCI from the first CORSET sent by the base station through the second beam when the first UE is in a state of not acquiring remaining system information (RMSI); and acquiring the RMSI through the second beam according to the second DCI, wherein the plurality of PDCCHs comprised in the first CORSET further carry the second DCI configured to instruct the UE in the cell to acquire the RMSI according to the second DCI, and the acquiring the paging message sent by the base station to the first UE according to the first DCI comprises: acquiring the paging message sent by the base station to the first UE from a paging message set sent by the base station through the second beam according to the first DCI, wherein the paging message set comprises the paging message sent by the base station to at least one UE paged by the base station, and the paging message set, the RMSI, and the first CORSET have different frequency domains; or acquiring second DCI from a second CORSET sent by the base station through the second beam when the first UE is in a state of not acquiring RMSI, wherein the second CORSET comprises a plurality of PDCCHs carrying the second DCI; and acquiring the RMSI through the second beam according to the second DCI, wherein the first CORSET, the RMSI and the second CORSET have different frequency domains.

8. The method according to claim 7, wherein the second DCI is carried in the plurality of PDCCHs comprised in the first CORSET, and the RMSI comprises CORSET indication information configured to identify that the plurality of PDCCHs in the first CORSET carry at least one of the first DCI and the second DCI.

9. The method according to claim 7, wherein the second DCI is carried in the plurality of PDCCHs comprised in the second CORSET, and the acquiring the paging message sent by the base station to the first UE according to the first DCI comprises:

acquiring the paging message sent by the base station to the first UE from a paging message set sent by the base station through the second beam according to the first DCI, wherein the paging message set comprises the paging message sent by the base station to at least one UE paged by the base station; and the paging message set, the RMSI, the first CORSET, and the second CORSET have different frequency domains.

10. The method according to claim 7, wherein the second DCI is carried in the plurality of PDCCHs comprised in the second CORSET, and the RMSI comprises first location indication information configured to identify a time domain location and a frequency domain location of the first CORSET.

11. The method according to claim 7, wherein the receiving the paging indication information through the first beam comprises:

receiving the paging indication information on a non-scheduled physical channel through the first beam.

12. The method according to claim 7, wherein the receiving the paging indication information through the first beam comprises:

acquiring third DCI as the paging indication information from a third CORSET sent by the base station through the first beam, wherein the third CORSET comprises a plurality of PDCCHs, and the plurality of PDCCHs comprised in the third CORSET carry the third DCI.

13. The method according to claim 12, further comprising:

receiving RMSI, wherein the RMSI comprises second location indication information configured to identify a frequency domain location of the third CORSET.

14. An information transmission apparatus, comprising:
a processor; and
a memory configured to store an instruction executable by the processor,
wherein the processor is configured to perform the information transmission method of claim 7.

15. The information transmission apparatus according to claim 14, wherein the second DCI is carried in the plurality of PDCCHs comprised in the first CORSET, and the RMSI comprises CORSET indication information configured to identify that the plurality of PDCCHs in the first CORSET carry at least one of the first DCI and the second DCI.

16. The information transmission apparatus according to claim 14, wherein the second DCI is carried in the plurality of PDCCHs comprised in the second CORSET, and the RMSI comprises first location indication information configured to identify a time domain location and a frequency domain location of the first CORSET.

17. An information transmission apparatus, comprising:
a processor; and
a memory configured to store an instruction executable by the processor,
wherein the processor is configured to:
send a synchronization signal block (SSB) and paging indication information through a first beam, wherein the paging indication information is configured to identify user equipment (UE) paged by the base station in a cell served by the base station; and
send a first control resource set (CORSET) through a second beam, wherein the first CORSET comprises a plurality of physical downlink control channels (PDCCHs), the plurality of PDCCHs comprised in the first CORSET carry first downlink control information (DCI) configured to instruct the UE paged by the base station to acquire a paging message according to the first DCI,
wherein a timing index of the first beam corresponds to a timing index of the second beam,
wherein the processor is further configured to perform one of:
sending remaining system information (RMSI) and a paging message set through the second beam, wherein the paging message set comprises a paging message sent by the base station to at least one UE paged by the base station; the first CORSET, the RMSI, and the paging message set have different frequency domains; and the plurality of PDCCHs comprised in the first CORSET further carry second DCI configured to instruct the UE in the cell to acquire the RMSI according to the second DCI; or
sending RMSI, a second CORSET and a paging message set through the second beam, wherein the first CORSET, the RMSI, the second CORSET and the paging message set have different frequency domains; the second CORSET comprises a plurality of PDCCHs carrying second DCI configured to instruct the UE in the cell to acquire the RMSI according to the second DCI, and the paging message set comprises a paging message sent by the base station to at least one UE paged by the base station.

18. The information transmission apparatus according to claim 17, wherein the second DCI is carried in the plurality of PDCCHs comprised in the first CORSET, and the RMSI comprises CORSET indication information configured to identify that the plurality of PDCCHs in the first CORSET carry the first DCI and the second DCI.

19. The information transmission apparatus according to claim 17, wherein the second DCI is carried in the plurality of PDCCHs comprised in the second CORSET, and the RMSI comprises first location indication information configured to identify a time domain location and a frequency domain location of the first CORSET.

\* \* \* \* \*